(12) United States Patent
Hoff, III

(10) Patent No.: US 11,270,498 B2
(45) Date of Patent: Mar. 8, 2022

(54) REAL WORLD ACOUSTIC AND LIGHTING MODELING FOR IMPROVED IMMERSION IN VIRTUAL REALITY AND AUGMENTED REALITY ENVIRONMENTS

(71) Applicant: Sony Interactive Entertainment Inc., Tokyo (JP)

(72) Inventor: Kenneth E. Hoff, III, Foster City, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 13/674,608

(22) Filed: Nov. 12, 2012

(65) Prior Publication Data

US 2014/0132628 A1 May 15, 2014

(51) Int. Cl.
  *G06T 15/50* (2011.01)
  *G06F 3/147* (2006.01)
  *A63F 13/213* (2014.01)
  *A63F 13/28* (2014.01)
  *A63F 13/217* (2014.01)

(52) U.S. Cl.
  CPC ............ *G06T 15/50* (2013.01); *A63F 13/213* (2014.09); *A63F 13/217* (2014.09); *A63F 13/28* (2014.09); *G06F 3/147* (2013.01); *G06T 2215/16* (2013.01); *G09G 2360/144* (2013.01)

(58) Field of Classification Search
  CPC ......... G09G 5/00; G06T 15/50; G06T 19/006; G06T 15/02; G06T 2215/16; G06F 3/165; H04N 21/4781; A63F 2300/69; A63F 2300/8082; G06K 9/00671
  USPC ............................................ 345/633; 381/61
  See application file for complete search history.

(56) References Cited

U.S. PATENT DOCUMENTS

| | | | |
|---|---|---|---|
| 6,215,498 B1* | 4/2001 | Filo | G06F 3/011 345/419 |
| 6,702,767 B1 | 3/2004 | Douglas et al. | |
| 8,405,680 B1* | 3/2013 | Cardoso Lopes | G06T 19/00 345/426 |
| 9,183,676 B2* | 11/2015 | McCulloch | G06T 19/006 |

(Continued)

FOREIGN PATENT DOCUMENTS

EP    2 378 488 A2    10/2011

OTHER PUBLICATIONS

International Search Report and Written Opinion in PCT/US2013/069503 dated May 7, 2014.

*Primary Examiner* — Samantha (Yuehan) Wang
(74) *Attorney, Agent, or Firm* — Nixon Peabody LLP

(57) ABSTRACT

Systems and methods for modeling acoustic and lighting to provide improved immersion in a virtual reality and/or augmented reality environment are provided. In one aspect, systems and methods are provided to promote "improved augmented reality" which increases the realism and/or presence of virtual objects in the user's real environment. In some embodiments, changes in the user's actual room lighting are modeled in the virtual world to have a similar effect. In other embodiments, systems and methods are provided to promote immersion of a user in a virtual environment by extending the virtual world into the user's real world room. In this embodiment, lighting and/or sound from the virtual world is used to simulate the same or similar properties in the users actual, or real world environment, thereby improving virtual reality.

16 Claims, 7 Drawing Sheets

(56) References Cited

U.S. PATENT DOCUMENTS

| | | |
|---|---|---|
| 2008/0071136 A1 | 3/2008 | Oohashi et al. |
| 2010/0005062 A1* | 1/2010 | Van Den Dungen ........................ G06F 17/30265 707/E17.014 |
| 2012/0069131 A1* | 3/2012 | Abelow ..................... 348/14.01 |
| 2012/0257035 A1 | 10/2012 | Larsen |
| 2012/0327119 A1 | 12/2012 | Woo et al. |
| 2013/0009984 A1* | 1/2013 | Kawakami .................... 345/619 |
| 2013/0117377 A1* | 5/2013 | Miller ..................... H04L 67/38 709/205 |
| 2014/0099623 A1* | 4/2014 | Amit et al. ................... 434/350 |
| 2014/0125668 A1* | 5/2014 | Steed et al. .................. 345/426 |

* cited by examiner

REAL WORLD ACOUSTIC AND LIGHTING MODELING FOR IMPROVED IMMERSION IN VIRTUAL REALITY AND AUGMENTED REALITY ENVIRONMENTS

TECHNICAL FIELD

The present disclosure relates generally to electronic games, and more specifically to systems and methods for modeling acoustic and lighting to provide improved immersion in a virtual reality and/or augmented reality environment.

BACKGROUND

The capabilities of computer technology employed in systems or devices such as portable or home video game consoles, portable or desktop personal computers, set-top boxes, audio or video consumer devices, personal digital assistants, mobile telephones, media servers, and personal audio and/or video players and records and the like continues to increase. The devices provide enhanced information processing capabilities, high quality audio and video inputs and outputs, and large amounts of memory, among other capabilities, which enable new methods for interacting with such computer systems. These systems and devices may also include wired and/or wireless networking capabilities.

Realism in computer generated images and video is highly sought, and there is continued interest in providing computer systems and devices that enhance a users' experience, for example in a virtual reality environment such as but not limited to a gaming environment.

These computing devices typically use a separate control device, such as a mouse or game controller, to interact with the computing device's user interface. Users typically use a cursor or other selection tool displayed in the user interface to select objects by pushing buttons on the control device. Users also use the control device to modify and control those selected objects (e.g., by pressing additional buttons on the control device or moving the control device).

A variety of techniques have been employed to increase realism, particularly in a gaming environment. For example, devices that allow users to control and interact with a computer game console without the need to use a game controller have been developed. In other areas, lighting control systems in a user environment has been used to enhance the quality of image data generated. While such developments are useful, they are limited and do not significantly improve immersion of a user in a virtual reality and/or augmented environment. Further advancements are needed.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

In summary, the present disclosure relates generally to electronic games, and more specifically to systems and methods for modeling acoustic and/or lighting to provide improved immersion of a user in a virtual reality and/or augmented reality environment.

In one aspect, systems and methods are provided to promote immersion of a user (also sometimes referred to as a "player" or "game user") in a virtual environment. The virtual environment is generally, but not necessarily, a game display. For example in some embodiments, room lighting and room acoustical characteristics are captured and then used to simulate similar properties in the virtual world, i.e. such as on the game display. In other words, an object in the game display is made to look like it is part of the actual room the user is in by collecting visual and/or audio information from the actual room that is then used in some manner in the virtual simulation. This embodiment is referred to as "improved augmented reality" which increases the realism and/or presence of virtual objects in the user's real environment. In some embodiments, data, images, video and/or acoustic signals from one or more cameras and/or microphones in the user's real environment are captured and then used to simulate similar properties in the virtual world, thereby improving augmented reality. In some embodiments, changes in the users' actual room lighting are modeled in the virtual world to have a similar effect. For example, a user may shine a flashlight into the display to light up an object in the display.

In other embodiments, systems and methods are provided to promote immersion of a user in a virtual environment by extending the virtual world into the user's actual, or real world room. This embodiment is referred to as "improved virtual reality" and may be thought of as the inverse of the "improved augmented reality" embodiment. In this embodiment, lighting and/or sound from the virtual world is used to simulate the same or similar properties in the user's actual, or real world environment, thereby improving virtual reality. For example, a flashlight inside the display (i.e. the virtual world) will light up the user's actual environment.

According to another aspect, a computer system is disclosed that includes a processor configured to receive at least one of: lighting data and acoustic data, and to correlate the light and acoustic data to a modification of a user interface; and memory coupled to the processor and configured to store the lighting data and acoustic data.

The lighting data may be captured by one or more cameras. The lighting data may include reflections of light. The light may be infrared illumination. In some embodiments, light hitting the display surface from the room is captured as lighting data. In some embodiments cameras located at each of the four corners of the display are used.

The acoustic data may be captured by one or more microphones. In one example, virtual world acoustic simulation is employed. Sounds in the real room are recorded (the sound that hits the display surface), propagated into the virtual world and played back a properly spatialized sound as if reflected off of the extended virtual room.

According to a further aspect of the invention, a system is disclosed that includes a display to display a user interface that includes an object; one or more cameras to capture light data; a computing device coupled to the one or more cameras and the display, wherein the computing device is configured to provide the user interface to the display, determine a characteristic associated with the light data, correlate the light data to a command corresponding to the object, and modify the display of the user interface that includes the object based on the command.

The command may be a lighting of the object.

The light data may include reflections of light. The light data may include infrared illumination.

According to a further aspect of the invention, a system is disclosed that includes a display to display a user interface that includes an object; one or more microphones to capture acoustic data; a computing device coupled to the one or more microphones and the display, wherein the computing device is configured to provide the user interface to the display, determine a characteristic associated with the acoustic data, correlate the acoustic data to a command corresponding to the object, and modify the display of the user interface that includes the object based on the command.

According to another aspect of the invention, a method is disclosed comprising receiving at least one of: lighting data and acoustic data, and correlating the light and acoustic data to a modification of a user interface; and modifying the display of the object in the user interface.

In some embodiments, modifying the display of the object may include modifying lighting characteristics of the object. Lighting characteristics of an object may include brightness, color, temperature, intensity, propagation direction, frequency or wavelength spectrum, polarization, and the like. In some embodiments, modifying the display of the object may include modifying acoustic characteristics. Acoustic characteristics may include loudness, wavelength, period, frequency, pitch, attenuation, spreading, scattering, impedance, interference, echoes, reverberation, Doppler shift, and the like.

According to yet another aspect of the invention, a computer-readable storage media is disclosed having computer executable instructions stored thereon which cause a computer system to carry out the above method when executed.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
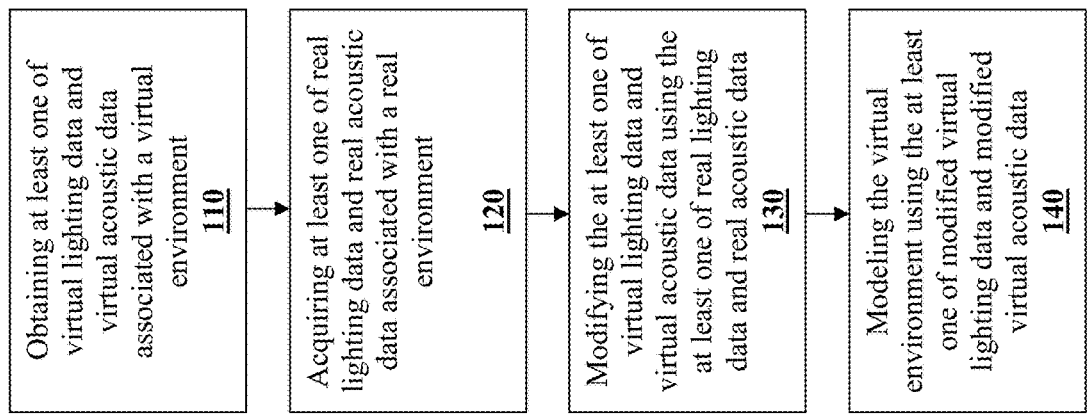
FIG. 1 is a flow chart illustrating a method for improved immersion in augmented reality environments according to an embodiment of the invention.

In the following description, numerous details are set forth. It will be apparent, however, to one skilled in the art, that embodiments of the invention may be practiced without these specific details. In some instances, well-known structures and devices are shown in block diagram form, rather than in detail, in able to avoid obscuring embodiments of the invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as disclosed herein and generally, is conceived to be a self-consistent sequence of steps leading to a desired result. The steps are those requiring physical manipulations of physical quantities. Usually, though not necessarily, these quantities take the form of electrical, acoustic or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "converting", "determining", "correlating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the present invention also relate to an apparatus or system for performing the operations herein. This apparatus or system may be specifically constructed for the required purposes, or it may comprise a general purpose computer selectively activated or reconfigured by a computer program stored in the computer. In one embodiment, the apparatus or system performing the operations described herein is a game console (e.g., a SONY PLAYSTATION, a NINTENDO WII, a MICROSOFT XBOX, etc.). A computer program may be stored in a computer readable storage medium, which is described in further detail with reference to FIG. 6.

To enhance immersion of a user in a virtual reality, or game, environment, systems and methods for modeling acoustic and/or lighting are disclosed herein to provide (a) improved augmented reality, and/or (b) improved virtual reality.

Unless specifically stated otherwise as apparent from the following discussion, it is appreciated that throughout the description, certain terms may be used interchangeably. For example, when referring to the users' physical environment, the terms "actual," "real," "real world," "actual room," "real environment" and "real room" may be used interchangeably.

Improved Augmented Reality

Improved augmented reality is directed to the situation where the user's real room or environment is modified. The goal is to increase the realism and presence of virtual objects in the user's real environment: make an object in the display look like it is a part of the room they are in by collecting visual and audio information from the real room that can be used in the virtual simulation.

In this "improved augmented reality" embodiment, the realism and/or presence of virtual objects in the user's real environment is enhanced or increased. In some embodiments, data, images, video and/or acoustic signals from one or more cameras and/or microphones in the user's real environment are captured and then used to simulate similar properties in the virtual world, thereby improving augmented reality. In some embodiments, changes in the users' actual room lighting are modeled in the virtual world to have a similar effect. For example, a user may shine a flashlight into the display to light up an object in the display.

In general, in some embodiments improved augmented reality is accomplished by one of more of the following techniques:

Head-Tracked Stereo 3D: To make a virtual object appear to be inside the display with the proper geometric alignment, a user head tracking system may be used to ascertain a proper viewing projection. One example of a suitable head tracking system that may be used with the present invention is described in detail in pending U.S. patent application Ser. No. 13/083,349 ("Systems and Methods for Providing Feedback by Tracking User Gaze and Gestures"), the entire disclosure of which is hereby incorporated by reference.

Virtual Object Re-Lighting: In order to properly light the virtual object, at least one camera facing away from the display is used. In one embodiment, a centered psEye camera is used. In some embodiments, a portion, or substantially all, light hitting the display surface from the room is captured. One or more cameras are used. In some embodiments cameras located at each of the four corners of the display may be used, however, any suitable number and/or location of cameras may be employed. These video images are used as environment-mapped lighting for the virtual objects. This allows a person to turn on and off a light, or obscure a light and it will affect the virtual object. A flashlight shining into the display should light up the object.

Real Room Audio Hitting Virtual Environment: With a virtual world acoustic simulation, sounds in the real environment are recorded (the sound that hits the display surface), propagated into the virtual world and played back a properly spatialized sound as if reflected off of the extended virtual environment. In some embodiments, one or more microphones are used to record sounds in the real environment. One or more speakers can be used to play back the properly spatialized sound.

FIG. 1 is a flow chart illustrating a method for improved immersion in augmented reality environments according to an embodiment of the invention. In one embodiment, the method described with respect to FIG. 1 is performed by a computing device. At block 110, virtual lighting data, virtual acoustic data, or both, which are associated with a virtual environment, are obtained. The virtual environment can be, for example, a scene in a video game, and the lighting and acoustics associated with that particular scene can be obtained. The virtual lighting data and/or virtual acoustic data can be obtained one or more times randomly, at one or more intervals, continuously, or on demand.

At block 120, real lighting data, real acoustic data, or both, which are associated with a real environment, are acquired. The real environment can be, for example, the living room of a user who is playing a video game, and the lighting and acoustics associated with that living room can be obtained. The real lighting data and/or real acoustic data can be obtained one or more times randomly, at one or more intervals, continuously, or on demand. As described further herein, the real lighting data and/or real acoustic data can be obtained by one or more cameras, microphones, and/or other suitable sensors.

It is contemplated that "lighting" as used herein can refer both to the presence and the absence of light. Similarly, "acoustics" as used herein can refer to both the presence and the absence of sound in this context. Lighting data may include lighting characteristics, such as brightness, color, temperature, intensity, propagation direction, frequency or wavelength spectrum, polarization, and the like. Acoustic data may include acoustic characteristics, such as loudness, wavelength, period, frequency, pitch, attenuation, spreading, scattering, impedance, interference, echoes, reverberation, Doppler shift, and the like.

At block 130, the virtual lighting data and/or virtual acoustic data are modified using the real lighting data and/or real acoustic data. At block 140, the virtual environment is modeled using the modified virtual lighting data and/or modified virtual acoustic data. The virtual environment can be modeled to take into account various parameters of the virtual environment, such as depth, height and width of the scene, and whether objects are present in the scene. If objects are present in the scene, additional parameters may be taken into account, such as how many, sizes, locations, textures, densities, movements, and other factors that may affect the propagation of light and sound in the virtual environment.

In one example, the virtual lighting data may correspond to a black screen, and the virtual acoustic data may correspond to silence. The real lighting data may correspond to bright white light, and the real acoustic data could correspond to a user yelling. In this example, the virtual lighting data is modified to include a light source corresponding to the bright white light, and the virtual acoustic data is modified to include the user's yell. The virtual environment can then be modeled using the modified virtual lighting data and modified virtual acoustic data, taking into account the parameters of the virtual environment. For example, the light source can light up a virtual scene previously hidden in the dark, such as a long hallway, and the user's yell can echo down the hallway.

Although described in this example as having an absence of light and sound in the virtual lighting data and virtual acoustic data, it is contemplated that the virtual lighting data and virtual acoustic data may initially represent a presence of light and sound that are affected by (e.g., augmented by, deadened by or adjusted by) the real lighting data and real acoustic data. For example, the virtual lighting data may represent dim light. The real lighting data may correspond to the light produced by a flashlight, i.e., centrally bright with gradually decreasing intensity from the center. The virtual lighting data is modified in this example to include both the dim light and the flashlight light. A virtual environment of a dimly lit bedroom can be modeled with the light from a flashlight shining into the room.

As described above, one or more cameras and/or one or more microphones can be employed. The cameras and microphones are located in any suitable location, and the desired location(s) may be selected based on the application, the level of realism or improved reality desired, and the like. In some embodiments, the camera(s) and/or microphone(s) are located on the display itself. In some embodiments, the camera(s) and/or microphone(s) are located on one or more surround sound speakers present in the users' real environment. In some embodiments, the camera(s) and/or microphone(s) are scattered in many parts of the users' environment, such as a room, depending on the application and the desired level of realism.

Improved Virtual Reality

Improved virtual reality is directed to the situation where the virtual reality environment, such as the display associated with an electronic game, is modified. The goal is to increase the feeling that the user is integrated into the virtual environment by extending the virtual world into the user's actual room by applying the virtual visuals beyond the display and audio that models the virtual spatial model with the real room acoustics effectively cancelled out.

This "improved virtual reality" embodiment may be thought of as the inverse of the "improved augmented reality" embodiment. In this embodiment, lighting and/or sound from the virtual world is used to simulate the same or similar properties in the users actual, or real world environment, thereby improving virtual reality. For example, a flashlight inside the display (i.e. the virtual world) will light up the users' actual environment.

In general, in some embodiments improved virtual reality is accomplished by one of more of the following techniques:

Real Room Re-Lighting: In some embodiments, real room re-lighting may be employed by using an array of lights in the room to augment the room lighting based on the virtual lighting. In some embodiments, a single RGB light on the display shining outwards or even a white strobe light is employed. According to embodiments of the invention, re-lighting is directed and focused in a purposeful way in order to augment lighting in the real room to correspond to lighting in the virtual world. In one example of embodiments of the system and method of the invention, a flashlight inside the virtual world lights up the real room.

Virtual Reality Audio: In some embodiments, surround sound is used to extend the virtual world into the real world environment or room. For example, if a virtual explosion takes place on the left side of the virtual environment, surround sound can be used to propagate the sound of the explosion on the left side of the real environment.

Figure 2:
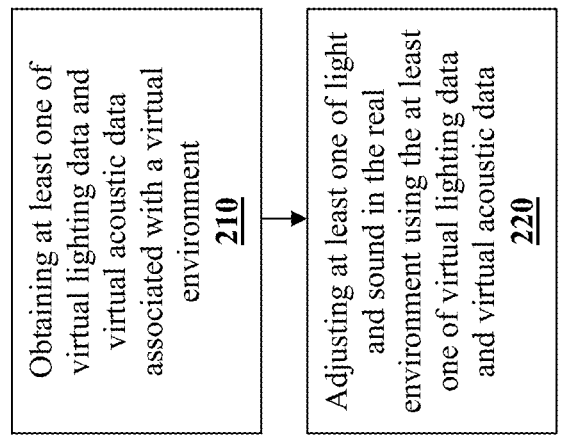
FIG. 2 is a flow chart illustrating a method for improved immersion in virtual reality environments according to an embodiment of the invention.

FIG. 2 is a flow chart illustrating a method for improved immersion in virtual reality environments according to an embodiment of the invention. In one embodiment, the method described with respect to FIG. 2 is performed by a computing device. At block 210, virtual lighting data, virtual acoustic data, or both, associated with a virtual environment, are obtained. The virtual environment can be, for example, a scene in a video game, and the lighting and acoustics associated with that particular scene can be obtained. The virtual lighting data and/or virtual acoustic data can be obtained one or more times randomly, at one or more intervals, continuously, or on demand.

At block 220, light, sound or both in the real environment is adjusted using the virtual lighting data and/or the virtual acoustic data. Light and/or sound can be adjusted in the real environment by additional or existing light sources and/or sound sources. In one embodiment, previously installed lighting fixtures (e.g., lamps, ceiling lights, etc.) in the real environment can be adjusted. Alternatively or additionally, light sources can be added to the real environment specifically for this purpose, such as strobe lights, LED lights, and the like. Similarly, previously installed sound sources (e.g., surround sound, speakers, etc.) in the real environment can be adjusted. Alternatively or additionally, sound sources can be added to the real environment specifically for this purpose.

For example, the virtual lighting data and virtual acoustic data may correspond to an explosion occurring on the left side of the virtual environment. This data can be used to adjust light and sound in the real environment, such as by flashing a light (e.g., a strobe light positioned on the left side of the real environment) and playing the sound of the explosion (e.g., using surround sound) on the left side of the real environment.

Figure 3:
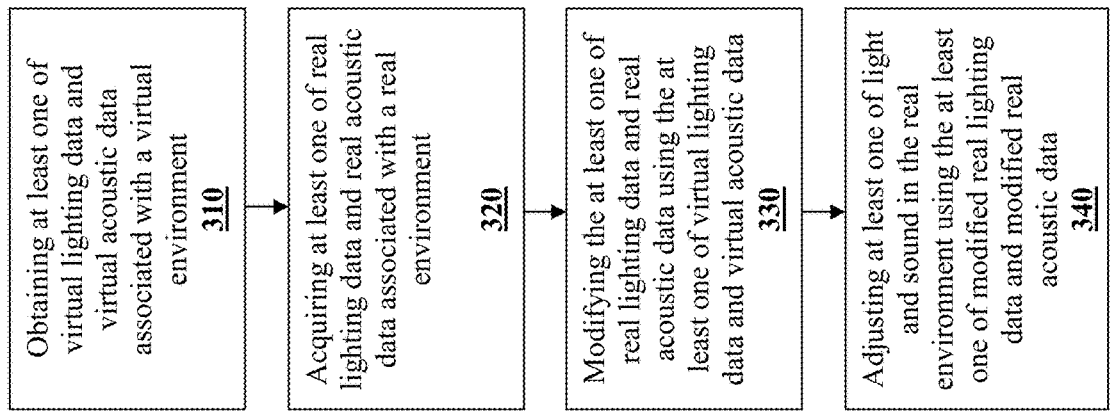
FIG. 3 is a flow chart illustrating a method for improved immersion in virtual reality environments according to an embodiment of the invention.

FIG. 3 is a flow chart illustrating a method for improved immersion in virtual reality environments according to another embodiment of the invention. In one embodiment, the method described with respect to FIG. 3 is performed by a computing device. In this embodiment, real lighting data and/or real acoustic data is obtained and used in conjunction with the virtual lighting data and/or virtual acoustic data to determine the level of light and/or sound adjustment to make in the real environment.

At block 310, virtual lighting data, virtual acoustic data, or both, associated with a virtual environment are obtained. At block 320, real lighting data, real acoustic data, or both, associated with a real environment, are acquired. The real lighting data and/or real acoustic data can be obtained by one or more cameras, microphones, and/or other suitable sensors. At block 330, the real lighting data and/or real acoustic data is modified using the virtual lighting data and/or virtual acoustic data. At block 340, light and/or sound in the real environment is adjusted using the modified real lighting data and/or modified real acoustic data.

For example, the virtual lighting data and virtual acoustic data may correspond to an explosion occurring on the left side of the virtual environment. The real lighting data and real acoustic data may correspond to a dark, quiet real environment. The real lighting data can be modified to create a low intensity flash, and real acoustic data can be modified to create a low volume sound of an explosion, and the light and sound in the real environment can be adjusted according to this data. In this example, a high intensity flash of light and high volume sound of an explosion is not necessary to have the desired light and sound effects given the dark, quiet nature of the real environment. In another example, a loud, bright real environment may require a high intensity flash and high volume sound of an explosion, in order for the effect to be appreciable in the real environment. Thus, in one embodiment, the real lighting data and real acoustic data can be modified with the virtual lighting data and virtual acoustic data proportional to the level of light and sound already present in the real environment.

In this embodiment, one or more cameras and one or more microphones are employed. The cameras and microphones are located in any suitable location, and the desired location(s) may be selected based on the application, the level of realism or improved reality desired, and the like. In some embodiments, the camera(s) and/or microphone(s) are located on the display itself. In some embodiments, the camera(s) and/or microphone(s) are located on one or more surround sound speakers present in the users' real environment. In some embodiments, the camera(s) and/or microphone(s) are scattered in many parts of the users' environment, such as a room, depending on the application and the desired level of realism.

Figure 4:
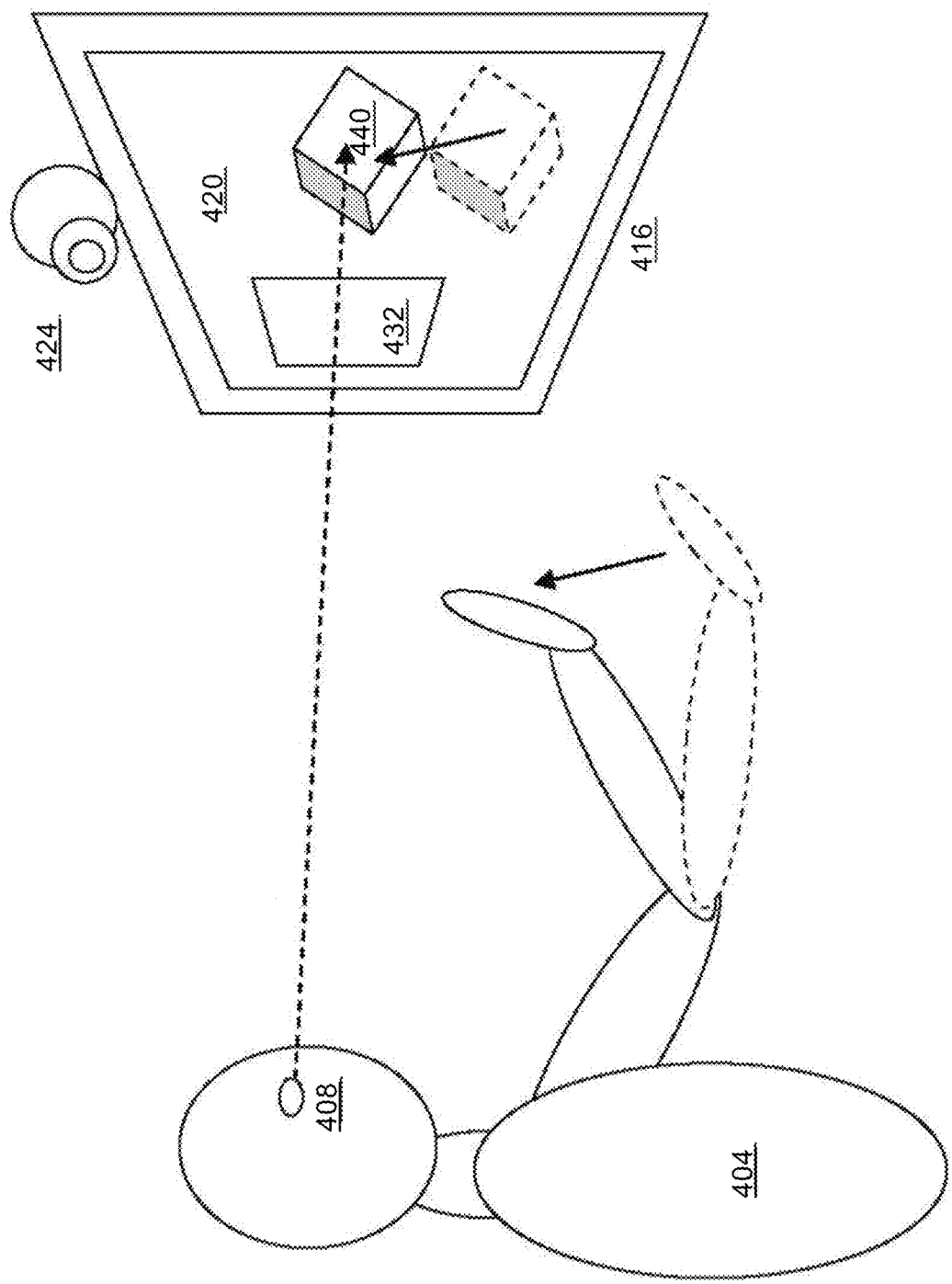
FIG. 4 is a schematic diagram illustrating a user interacting with a display according to some embodiments of the present invention.

Referring to FIG. 4, a schematic diagram illustrating a user interacting with a display according to some embodiments of the present invention is shown. The user 404 is schematically illustrated with the user's eye 408. The user 404 views a display 416 which displays a user interface 420 (e.g., a video game, an Internet browser window, word processing application window, and the like). The display 416 includes a computing device or is coupled to a computing device, such as a video game console or computer. In some embodiments, the display 416 may be wired or wirelessly connected over the Internet to a computing device such as a server or other computer system. The computing device provides the user interface 420 to the display 416.

One or more cameras 424 are shown positioned over the display 416 with the lens of the camera 424 pointed generally in the direction of the user 404. In one embodiment, the camera 424 captures room light, or light data, hitting the display 420. The computing device analyzes the light data input from the at least one camera to determine for example an area of the display 432 where light is hitting the display, and if for example, the user is shining a flashlight (not shown) at a specific object 440, the computing device will modify display of the object 440 to appear as if the object 440 is being lit up by the user's flashlight, including proper diffusion of light and shadows. In some embodiments, one or more arrays of cameras 424 are employed. The arrays of cameras 424 may be positioned at any suitable location such that light data in the actual room is captured.

Figure 5:
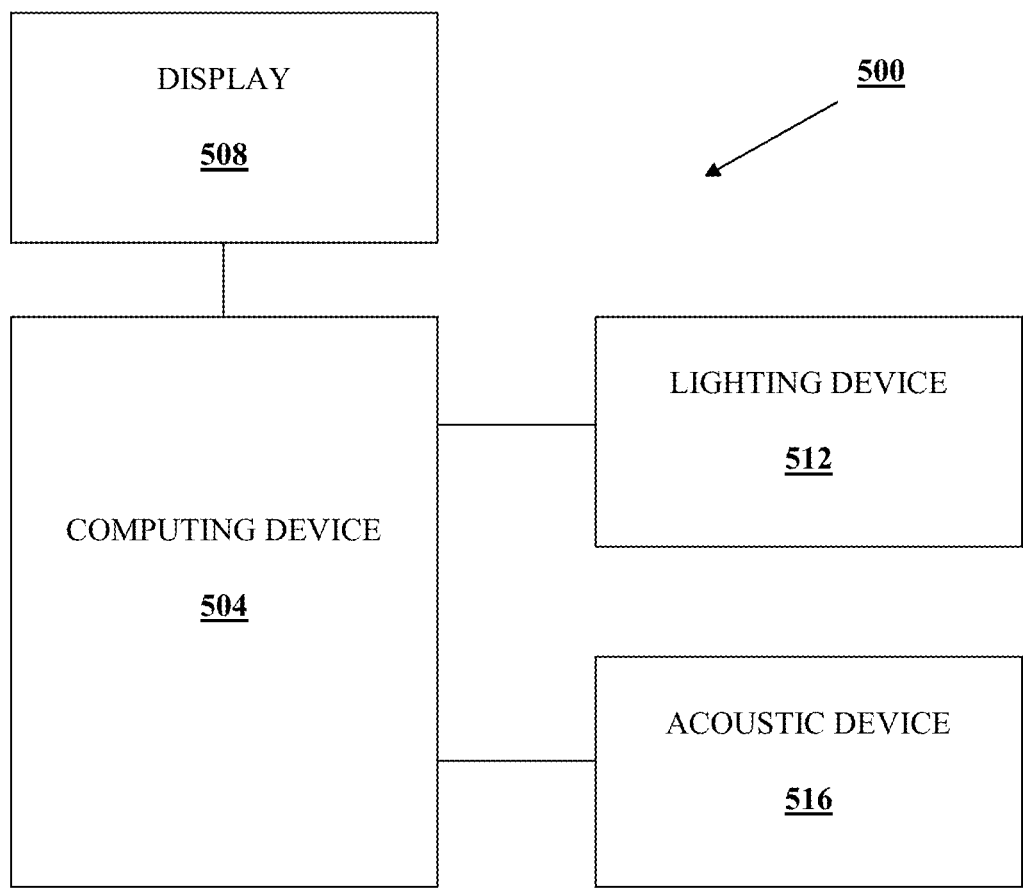
FIG. 5 is a block diagram illustrating a system for modeling light and/or acoustic data to enhance a virtual reality or augmented reality environment according to some embodiments of the present invention.

FIG. 5 illustrates a system 500 for providing improved immersion in a virtual reality and/or augmented reality environment according to some embodiments of the invention. The system 500 includes a computing device 504 coupled to a display 508. The system 500 also includes lighting device(s) 512, such as cameras or other light sensors, and optionally acoustic device(s) 516, such as microphones or other sound sensors, coupled to the computing device 504. The computing device 504 processes light and/or acoustic data received by the camera 512 and the acoustic device 516, respectively.

In some embodiments, the camera captures light data striking an image on the display. The light data is analyzed by the computing device 504 to identify certain characteristics, such as one or more of the reflection of the light, intensity, location, brightness, color, temperature, propagation direction, frequency or wavelength spectrum, and polarization. This light data is then analyzed or correlated and used to modify the display of the user interface in some manner.

The one or more cameras may be a standard or 3-D video camera. The 3-D video camera may capture depth information (e.g., distance between the sensor and the user) directly or indirectly. Pre-configured information may be required to determine the depth information when a standard video camera.

The devices 512, 516 may be connected with the computing device 504 through wired and/or wireless connections. Exemplary wired connections include connections made via an IEEE 1394 (firewire) cable, an Ethernet cable, a universal serial bus (USB) cable, etc. Exemplary wireless connections include wireless fidelity (WIFI) connections, BLUETOOTH connections, ZIGBEE connections, and the like.

The devices 512, 516 provide the data to the computing device 504 continuously and in real-time. In some embodiments, camera device 512 simply provides the captured image data (e.g., the video feed that includes the near-infrared illumination reflections).

The computing device 504 may be a gaming system (e.g., a game console), a personal computer, a game kiosk, a television that includes a computer processor, or other computing system. The computing device 504 may execute programs corresponding to games or other applications that can cause the computing device 504 to display a user interface that includes at least one object on the display 508. The computing device 504 also executes programs that determine a user's response to the user interface using data received from the devices 512, 516 and responds to the user input (e.g., by changing the user interface displayed on the display 508) based on the received data. The computing device 504 may include memory to store the data received from the devices 512, 516.

Figure 6:
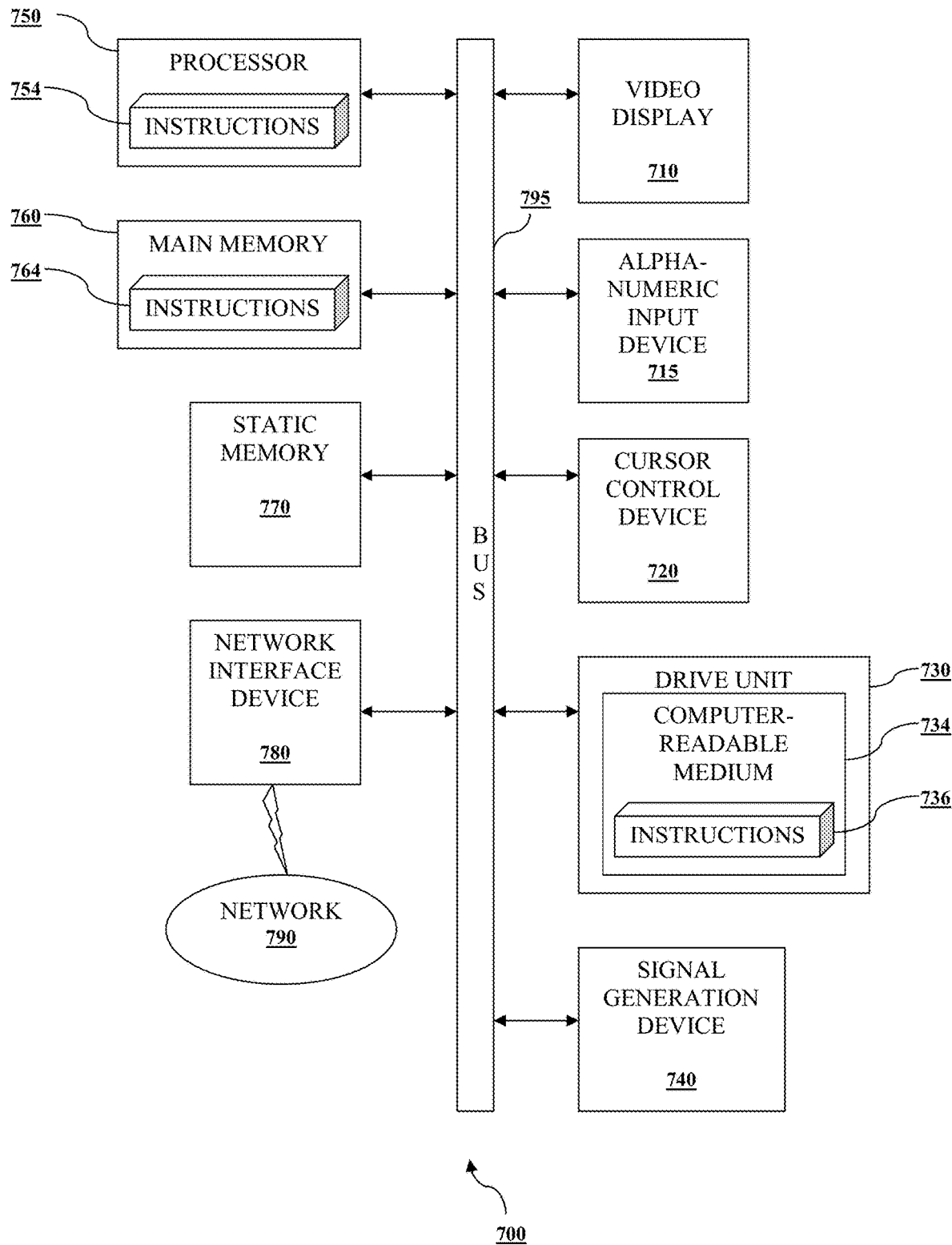
FIG. 6 is diagrammatic representation of a machine having a set of instructions for causing the machine to perform any of the one or more methods described herein.

FIG. 6 shows a diagrammatic representation of machine in the exemplary form of computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, as a host machine, or as a peer machine in a peer-to-peer (or distributed) network environment. The machine may be a personal computer (PC), a tablet, a set-top box (STB), a Personal Digital Assistant (PDA), a cellular telephone, a web appliance, a network router, switch or bridge, a game console, a television, a CD player, a DVD player, a BD player, an e-reader, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 is a SONY PLAYSTATION gaming system.

According to some embodiments, computer system 700 comprises processor 750 (e.g., a central processing unit (CPU), a graphics processing unit (GPU) or both), main memory 760 (e.g., read only memory (ROM), flash memory, dynamic random access memory (DRAM) such as synchronous DRAM (SDRAM) or Rambus DRAM (RDRAM), etc.) and/or static memory 770 (e.g., flash memory, static random access memory (SRAM), etc.), which communicate with each other via bus 795.

According to some embodiments, computer system 700 may further comprise video display unit 710 (e.g., a liquid crystal display (LCD), a light-emitting diode display (LED), an electroluminescent display (ELD), plasma display panels (PDP), an organic light-emitting diode display (OLED), a surface-conduction electron-emitted display (SED), a nanocrystal display, a 3D display, or a cathode ray tube (CRT)). According to some embodiments, computer system 700 also may comprise alphanumeric input device 715 (e.g., a keyboard), cursor control device 720 (e.g., a mouse or controller), disk drive unit 730, signal generation device 740 (e.g., a speaker), and/or network interface device 780.

Disk drive unit 730 includes computer-readable medium 734 on which is stored one or more sets of instructions (e.g., software 736) embodying any one or more of the methodologies or functions described herein. Software 736 may also reside, completely or at least partially, within main memory 760 and/or within processor 750 during execution thereof by computer system 700, main memory 760 and processor 750. Processor 750 and main memory 760 can also constitute computer-readable media having instructions 754 and 764, respectively. Software 736 may further be transmitted or received over network 790 via network interface device 780.

While computer-readable medium 734 is shown in an exemplary embodiment to be a single medium, the term "computer-readable medium" should be taken to include a single medium or multiple media (e.g., a centralized or distributed database, and/or associated caches and servers)

that store the one or more sets of instructions. The term "computer-readable medium" shall also be taken to include any medium that is capable of storing, encoding or carrying a set of instructions for execution by the machine and that cause the machine to perform any one or more of the methodologies of the disclosed embodiments. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the disclosed embodiments.

Figure 7:
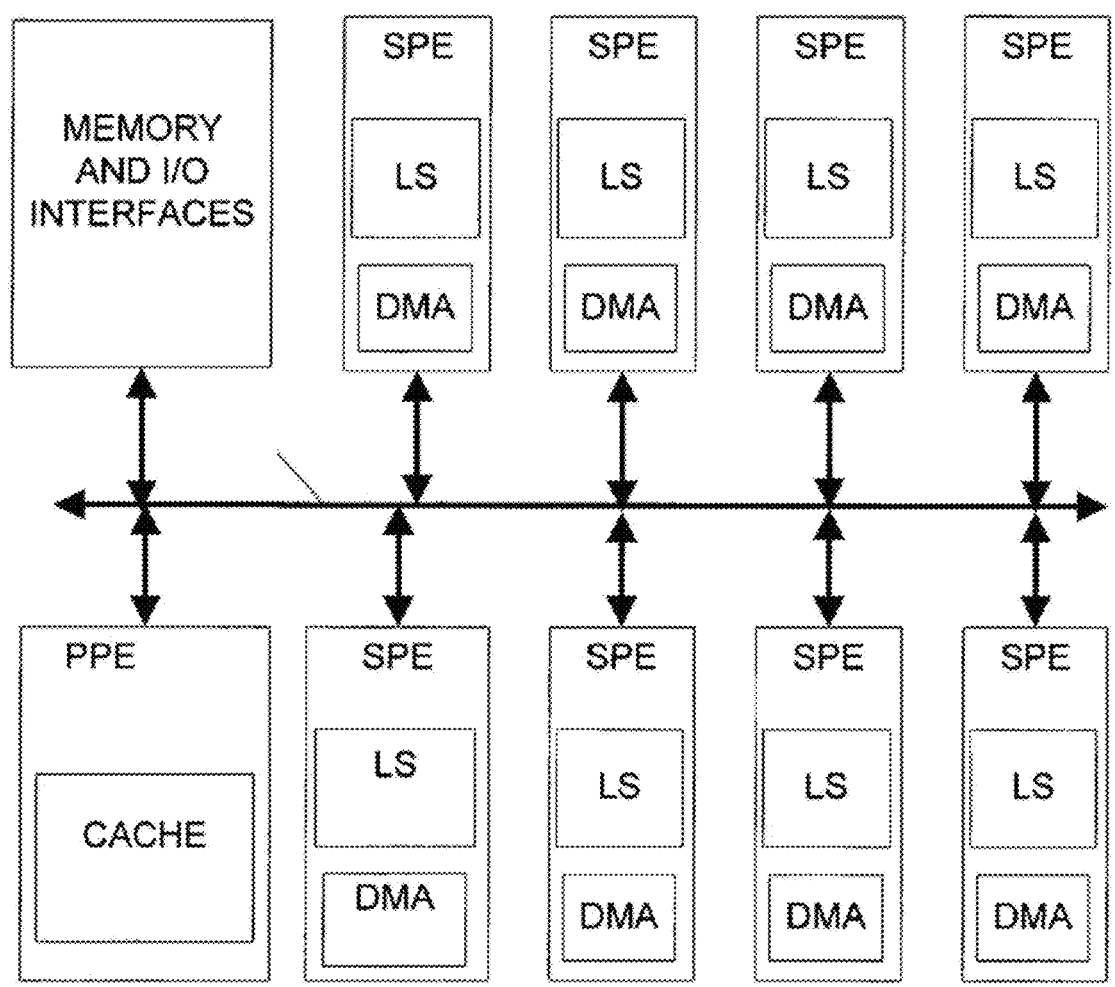
FIG. 7 is a block diagram illustrating additional hardware that may be used to process instructions according to some embodiments of the present invention.

FIG. 7 illustrates additional hardware that may be used to process instructions, in accordance with one embodiment of the present invention. FIG. 7 illustrates the components of a cell processor 800, which may correspond to the processor 750 of FIG. 6, in accordance with one embodiment of the present invention. The cell processor 800 has an architecture comprising four basic components: external input and output structures comprising a memory controller 860 and a dual bus interface controller 870A, B; a main processor referred to as the Power Processing Element 850; eight co-processors referred to as Synergistic Processing Elements (SPEs) 810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 850 is based upon a two-way simultaneous multithreading Power 1470 compliant PowerPC core (PPU) 855 running with an internal clock of 3.2 GHz. It comprises a 512 kB level 2 (L2) cache and a 32 kB level 1 (L1) cache. The PPE 850 is capable of eight single position operations per clock cycle, translating to 25.6 GFLOPs at 3.2 GHz. The primary role of the PPE 850 is to act as a controller for the Synergistic Processing Elements 510A-H, which handle most of the computational workload. In operation the PPE 850 maintains a job queue, scheduling jobs for the Synergistic Processing Elements 810A-H and monitoring their progress. Consequently each Synergistic Processing Element 810A-H runs a kernel whose role is to fetch a job, execute it and synchronize it with the PPE 850.

Each Synergistic Processing Element (SPE) 810A-H comprises a respective Synergistic Processing Unit (SPU) 820A-H, and a respective Memory Flow Controller (MFC) 840A-H comprising in turn a respective Dynamic Memory Access Controller (DMAC) 842A-H, a respective Memory Management Unit (MMU) 844A-H and a bus interface (not shown). Each SPU 520A-H is a RISC processor clocked at 3.2 GHz and comprising 256 kB local RAM 830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 820A-H does not directly access the system memory XDRAM 1426; the 64-bit addresses formed by the SPU 820A-H are passed to the MFC 840A-H which instructs its DMA controller 842A-H to access memory via the Element Interconnect Bus 880 and the memory controller 860.

The Element Interconnect Bus (EIB) 880 is a logically circular communication bus internal to the Cell processor 800 which connects the above processor elements, namely the PPE 850, the memory controller 860, the dual bus interface 870A,B and the 8 SPEs 810A-H, totaling 12 participants. Participants can simultaneously read and write to the bus at a rate of 8 bytes per clock cycle. As noted previously, each SPE 810A-H comprises a DMAC 842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 860 comprises an XDRAM interface 862, developed by Rambus Incorporated. The memory controller interfaces with the Rambus XDRAM with a theoretical peak bandwidth of 25.6 GB/s.

The dual bus interface 870A,B comprises a Rambus FlexIO® system interface 872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and an I/O Bridge via controller 570A and a Reality Simulator graphics unit via controller 870B.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. The computer devices can be PCs, handsets, servers, PDAs or any other device or combination of devices which can carry out the disclosed functions in response to computer readable instructions recorded on media. The phrase "computer system", as used herein, therefore refers to any such device or combination of such devices.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method for improved immersion in virtual reality environments, the method comprising:

obtaining at least one of virtual lighting data and virtual acoustic data corresponding to at least one lighting or acoustic event that occurs in a virtual environment, wherein the virtual environment is a scene in a virtual experience;

acquiring at least one of real lighting data and real acoustic data corresponding to at least one of lighting or sound in a real environment, wherein the real environment is a physical setting of a user of the virtual experience;

modifying the at least one of real lighting data and real acoustic data based on the at least one of virtual lighting data and virtual acoustic data to capture the at least one lighting event or acoustic event in the virtual environment in the at least one of real lighting data and real acoustic data, wherein the modifying is proportional to a level of the at least one of lighting or sound already present in the real environment; and adjusting the lighting, the sound, or a combination thereof in the real environment based on the modified at least one of real lighting data and real acoustic data.

2. The method of claim 1, wherein the light is adjusted by a strobe light.

3. The method of claim 1, wherein the sound is adjusted by surround sound.

4. The method of claim 1, wherein the virtual lighting data comprises at least one of brightness, color, temperature, intensity, propagation direction, frequency or wavelength spectrum, and polarization.

5. The method of claim 1, wherein the virtual acoustic data comprises at least one of loudness, wavelength, period, frequency, pitch, attenuation, spreading, scattering, impedance, interference, echoes, reverberation, and Doppler shift.

6. The method of claim 1, wherein the adjusting the lighting, the sound, or a combination thereof in the real environment comprises adjusting lighting from installed lighting fixtures within the real environment.

7. The method of claim 1, wherein the adjusting the lighting, the sound, or a combination thereof in the real environment comprises adjusting sound from installed sound fixtures within the real environment.

8. The method of claim 1, wherein the adjusting comprises adjusting only the sound in the real environment based on the modified real acoustic data.

9. The method of claim 1, wherein the modifying is proportional to the level of the at least one of the lighting or sound already present in the real environment such that the modifying, when the level of the at least one of the lighting or sound already present in the real environment is at a first level, is greater than the modifying when the level of the at least one of the lighting or sound already present in the real environment is at a second level that is lower than the first level.

10. A system for improved immersion in virtual reality environments, the system comprising:

at least one of a light source and a sound source configured to produce at least one of light and sound in a real environment;

a processor coupled to the at least one of the light source and the sound source configured to:

obtain at least one of virtual lighting data and virtual acoustic data corresponding to at least one lighting or acoustic event that occurs in a virtual environment, wherein the virtual environment is a scene in a virtual experience, acquire at least one of real lighting data and real acoustic data corresponding to at least one of lighting or sound in the real environment, modify the at least one of real lighting data and real acoustic data based on the at least one of virtual lighting data and virtual acoustic data to capture the at least one lighting event or acoustic event in the virtual environment in the at least one of real lighting data and real acoustic data, wherein the modifying is proportional to a level of the at least one of lighting or sound already present in the real environment; and generate a command to the at least one of the light source and the sound source to adjust the lighting, the sound, or a combination thereof in the real environment based on the modified at least one of real lighting data and real acoustic data; and a memory coupled to the processor.

11. The system of claim 10, further comprising:

at least one of a microphone and a camera configured to respectively capture the real acoustic data and real lighting data associated with the real environment.

12. The system of claim 10, wherein the light source is a strobe light.

13. The system of claim 10, wherein the sound source is a surround sound system.

14. The system of claim 10, wherein the virtual lighting data comprises at least one of brightness, color, temperature, intensity, propagation direction, frequency or wavelength spectrum, and polarization.

15. The system of claim 10, wherein the virtual acoustic data comprises at least one of loudness, wavelength, period, frequency, pitch, attenuation, spreading, scattering, impedance, interference, echoes, reverberation, and Doppler shift.

16. The system of claim 10, wherein the modifying is proportional to the level of the at least one of the lighting or sound already present in the real environment such that the modifying, when the level of the at least one of the lighting or sound already present in the real environment is at a first level, is greater than the modifying when the level of the at least one of the lighting or sound already present in the real environment is at a second level that is lower than the first level.

* * * * *